US010135215B2

(12) United States Patent
Winarski

(10) Patent No.: US 10,135,215 B2
(45) Date of Patent: *Nov. 20, 2018

(54) GRAPHENE OPTIC FIBER AMPLIFIERS

(71) Applicant: Tyson York Winarski, Mountain View, CA (US)

(72) Inventor: Tyson York Winarski, Mountain View, CA (US)

(*) Notice: Subject to any disclaimer, the term of this patent is extended or adjusted under 35 U.S.C. 154(b) by 280 days.

This patent is subject to a terminal disclaimer.

(21) Appl. No.: 14/816,001

(22) Filed: Aug. 1, 2015

(65) Prior Publication Data

US 2015/0380889 A1 Dec. 31, 2015

Related U.S. Application Data

(63) Continuation-in-part of application No. 14/153,068, filed on Jan. 12, 2014, now Pat. No. 9,105,284, and a continuation-in-part of application No. 14/673,872, filed on Mar. 31, 2015, now Pat. No. 9,328,018, and a continuation-in-part of application No. 14/710,592, filed on May 13, 2015, now Pat. No. 9,410,246.

(51) Int. Cl.
*D02G 3/00* (2006.01)
*H01S 3/067* (2006.01)
*H01S 3/094* (2006.01)
*G02B 1/04* (2006.01)

(52) U.S. Cl.
CPC .......... *H01S 3/06716* (2013.01); *G02B 1/045* (2013.01); *H01S 3/06754* (2013.01); *H01S 3/094003* (2013.01)

(58) Field of Classification Search
CPC . G02B 1/045; H01S 3/06716; H01S 3/06754; H01S 3/094003
See application file for complete search history.

(56) References Cited

U.S. PATENT DOCUMENTS

| | | | | |
|---|---|---|---|---|
| 8,139,617 B2* | 3/2012 | Song | ................ | H01S 3/1118 372/18 |
| 8,384,991 B2* | 2/2013 | Kieu | ................ | B82Y 20/00 359/337 |
| 2011/0222562 A1* | 9/2011 | Jiang | ................ | H01S 3/067 372/6 |

OTHER PUBLICATIONS

Zhang et al. Compact graphene mode-locked wavelength-tunable erbium-doped fiber lasers: from all anomalous dispersion to all normal dispersion, Laser Phys. Lett. 7, No. 8, 591-596 (2010).*
Ariel Ismach, Clara Druzgalski, Samuel Penwell, Adam Schwartzberg, Maxwell Zheng, Ali Javey, Jeffrey Bokor, and Yuegang Zhang, Direct Chemical Vapor Deposition of Graphene on Dielectric Surfaces, Nano Lett. 2010, 10, 1542-1548, American Chemical Society, Apr. 2, 2010.
Rui Wang, Yufeng Hao, Ziqian Wang, Hao Gong, and John T. L. Thong in Large-Diameter Graphene Nanotubes Synthesized Using Ni Nanowire Templates, Nano Lett. 2010, 10, 4844-4850, American Chemical Society, Oct. 28, 2010.

(Continued)

*Primary Examiner* — Holly C Rickman
*Assistant Examiner* — Linda N Chau
(74) *Attorney, Agent, or Firm* — The Winarski Firm, PLLC

(57) ABSTRACT

Optical fiber amplifiers are disclosed that utilize optic fibers encapsulated by graphene as the gain medium. Doped fiber optic amplifiers utilize optic fibers that are doped with a rare earth element for the gain medium that is encapsulated by graphene. Raman fiber optic amplifiers utilize an undoped fiber as the gain medium that is encapsulated by graphene.

20 Claims, 16 Drawing Sheets

(56) References Cited

OTHER PUBLICATIONS

Jan Wasylak, Maria Lacka, Jan Kucharski. Glass of high refractive index for optics and optical fiber. Opt. Eng. 36(6) 1648-1651 (Jun. 1997) Society of Photo-Optical Instrumentation Engineers.

Jie Sun, Niclas Lindvall, Matthew T. Cole, Teng Wang, Tim J. Booth, Peter Bøggild, Kenneth B. K. Teo, Johan Liu, and August Yurgens. Controllable chemical vapor deposition of large area uniform nanocrystalline graphene directly on silicon dioxide. Journal of Applied Physics 111, 044103 (2012).

Zhancheng Li, Ping Wu, Chenxi Wang, Xiaodong Fan, Wenhua Zhang, Xiaofang Zhai, Changgan Zeng, Zhenyu Li, Jinlong Yang, and Jianguo Hou. Low-Temperature Growth of Graphene by Chemical Vapor Deposition Using Solid and Liquid Carbon Sources. ACSNANO vol. 5, No. 4, 3385-3390, 2011.

Takatoshi Yamada, Masatou Ishihara, and Masataka Hasegawa. Low Temperature Graphene Synthesis from Poly (methyl methacrylate) Using Microwave Plasma Treatment. Applied Physics Express 6 (2013) 115102-1.

Alex Gray, Mehdi Balooch, Stephane Allegret, Stefan De Gendt, and Wei-E Wang. Optical detection and characterization of graphene by broadband spectrophotometry. Journal of Applied Physics 104, 053109 (2008).

Efraín Mejía-Beltrán (2012). Rare-Earth Doped Optical Fibers, Selected Topics on Optical Fiber Technology, Dr Moh. Yasin (Ed.), ISBN: 978-953-51-0091-1.

Q.L. Bao, H. Zhang, Y. Wang, Z.H. Ni, Y.L. Yan, Z.X. Shen, K.P. Loh, and D.Y. Tang, Adv. Funct. Mater. 19, 3077-3083 (2009).

\* cited by examiner

FIBER INDEX OF REFRACTION PROFILE

GRAPHENE OPTIC FIBER AMPLIFIERS

This application claims the benefit of U.S. patent application Ser. No. 14/153,068 filed on Jan. 12, 2014, which is also hereby incorporated by reference. This application also claims the benefit of U.S. patent application Ser. No. 14/673,872 filed on Mar. 31, 2015, which is also hereby incorporated by reference. This application also claims the benefit of U.S. patent application Ser. No. 14/710,592 filed on May, 13, 2015, which is also hereby incorporated by reference.

BACKGROUND

An optical amplifier is a device that amplifies an optical signal directly, without the need to first convert it to an electrical signal. An optical amplifier may be thought of as a laser without an optical cavity, or one in which feedback from the cavity is suppressed. Optical amplifiers are important in optical communication and laser physics.

There are several different physical mechanisms that can be used to amplify a light signal, which correspond to the major types of optical amplifiers. In Doped Fiber Amplifiers (DFAs) and fiber lasers, stimulated emission in the amplifier's gain medium causes amplification of incoming light. In Semiconductor Optical Amplifiers (SOAs), electron-hole recombination occurs. In Raman amplifiers, Raman scattering of incoming light with phonons in the lattice of the gain medium produces photons coherent with the incoming photons. Parametric amplifiers use parametric amplification.

Doped fiber amplifiers (DFAs) are optical amplifiers that use a doped optical fiber as a gain medium to amplify an optical signal. They are related to fiber lasers. The signal to be amplified and a pump laser are multiplexed into the doped fiber, and the signal is amplified through interaction with the doping ions. The most common example is the Erbium Doped Fiber Amplifier (EDFA), where the core of a silica fiber is doped with trivalent erbium ions and can be efficiently pumped with a laser at a wavelength of 980 nm or 1,480 nm, and exhibits gain in the 1,550 nm region.

Semiconductor optical amplifiers (SOAs) are amplifiers that use a semiconductor to provide the gain medium. These amplifiers have a similar structure to Fabry-Perot laser diodes but with anti-reflection design elements at the end faces. Recent designs include anti-reflective coatings and tilted waveguide and window regions which can reduce end face reflection to less than 0.001%. Since this creates a loss of power from the cavity that is greater than the gain, it prevents the amplifier from acting as a laser. Another type of SOA consists of two regions. One part has a structure of a Fabry-Pérot laser diode and the other has a tapered geometry in order to reduce the power density on the output facet.

Semiconductor optical amplifiers are typically made from group III-V compound semiconductors such as GaAs/AlGaAs, InP/InGaAs, InP/InGaAsP and InP/InAlGaAs, though any direct band gap semiconductors such as II-VI could conceivably be used. Such amplifiers are often used in telecommunication systems in the form of fiber-pigtailed components, operating at signal wavelengths between 0.85 µm and 1.6 µm and generating gains of up to 30 dB.

The semiconductor optical amplifier is of small size and electrically pumped. It can be potentially less expensive than the EDFA and can be integrated with semiconductor lasers, modulators, etc. However, the performance is still not comparable with the EDFA. The SOA has higher noise, lower gain, moderate polarization dependence and high nonlinearity with fast transient time. The main advantage of SOA is that all four types of nonlinear operations (cross gain modulation, cross phase modulation, wavelength conversion and four wave mixing) can be conducted. Furthermore, SOA can be run with a low power laser.

In a Raman amplifier, the signal is intensified by Raman amplification that is achieved by a nonlinear interaction between the signal and a pump laser within an optical fiber. There are two types of Raman amplifiers: distributed and lumped. A distributed Raman amplifier is one in which the transmission fiber is utilized as the gain medium by multiplexing a pump wavelength with signal wavelength, while a lumped Raman amplifier utilizes a dedicated, shorter length of fiber to provide amplification. In the case of a lumped Raman amplifier highly nonlinear fiber with a small core is utilized to increase the interaction between signal and pump wavelengths and thereby reduce the length of fiber required.

SUMMARY

A doped fiber amplifier is disclosed that is formed of a doped optic fiber. The doped optic fiber has a doped inner core and an undoped outer core surrounding the doped inner core. A graphene cylinder surrounds the undoped outer core. The graphene cylinder may be formed of a monolayer of graphene. The graphene cylinder may be formed of multilayer graphene. The graphene cylinder may be deposited onto said undoped outer core through a Chemical Vapor Deposition (CVD) process. The inner core may be doped with a rare earth element. For example, the inner core may be doped with erbium, ytterbium, neodymium, dysprosium, praseodymium, or thulium. The doped fiber amplifier may also include an optical pump that excites the rare earth element to a higher energy state to lase and amplify an optic signal. The optical pump may be co-propagating to the optic signal. The optical pump may be counter-propagating to the optic signal.

A doped fiber amplifier is disclosed that is formed of a doped optic fiber. The doped optic fiber has a doped inner core and an undoped outer core surrounding the doped inner core. A graphene capsule encapsulates the undoped outer core. The inner core is doped with a rare earth element. The rare earth element may be erbium, ytterbium, neodymium, dysprosium, praseodymium, and thulium. The doped fiber amplifier may also include an optical pump that excites the rare earth element to a higher energy state to lase and amplify an optic signal.

An optic fiber amplifier is disclosed that is formed of an optic fiber encapsulated by a graphene capsule. The optic fiber amplifier also has an optical pump coupled to the optic fiber. An optic signal carried by the optic fiber is amplified optically through a Raman effect by the optical pump. The graphene capsule may be formed of a monolayer of graphene. The graphene capsule may be formed of multilayer graphene. The graphene capsule may be deposited onto said undoped outer core trough a Chemical Vapor Deposition (CVD) process.

Further aspects of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

DETAILED DESCRIPTION

While the invention has been shown and described with reference to a particular embodiment thereof, it will be understood to those skilled in the art, that various changes in form and details may be made therein without departing from the spirit and scope of the invention.

Figure 1:
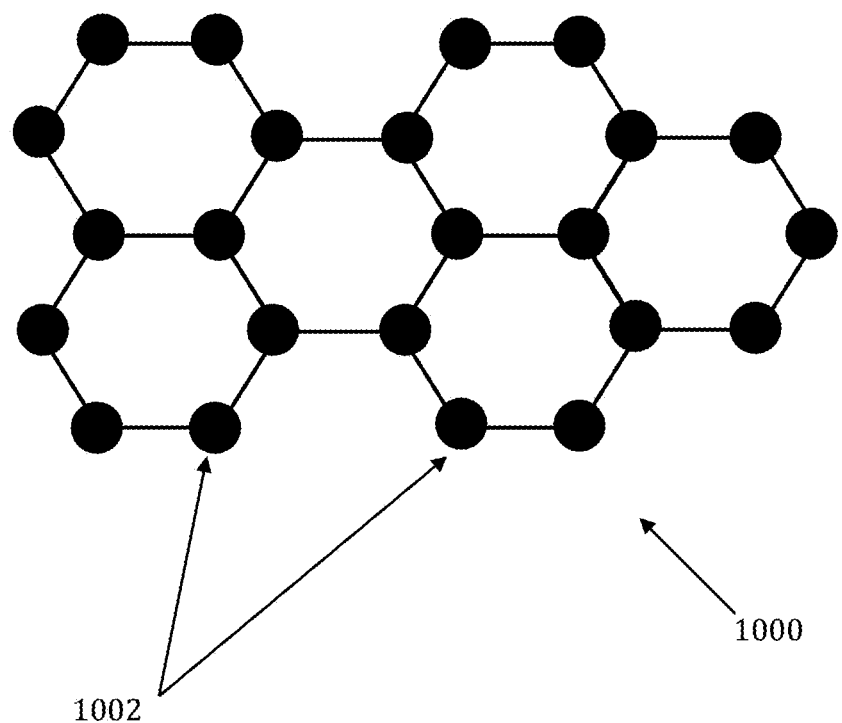
FIG. 1 illustrates a diagram of carbon atoms in a hexagonal lattice forming an atomically contiguous sheet of graphene.

FIG. 1 illustrates a diagram of carbon atoms 1002 in a hexagonal lattice forming an atomically contiguous sheet of graphene 1000. Graphene sheet 1000, also referred to as a graphene lattice 1000, is a flat monolayer of carbon atoms 1002 that are tightly packed into a two-dimensional lattice, thereby forming a sheet of graphene. Graphene lattice 1000 is 97.7% optically transparent. Thus, light used in combination with fiber optic cables can pass through a graphene layer for purposes of data transmission within a fiber optic communications network. Graphene lattice 1000 is an extremely strong material due to the covalent carbon-carbon bonds. It is desirable to utilize graphene lattices 1000 that are defect free as the presence of defects reduces the strength of graphene lattice 1000. The intrinsic strength of a defect free sheet of graphene 100 is 42 $Nm^{-1}$, making it one of the strongest materials known. The strength of graphene is comparable to the hardness of diamonds. Graphene is also a highly flexible material. Multiple monolayers of graphene sheet 1000 can be grown on top of each other to create a multi-layer graphene sheet. As discussed in FIG. 16, graphene exhibits a wavelength dependent index of refraction. It is therefore possible for graphene to function as a cladding layer in optic fiber applications when paired with an appropriate fiber optic core that has an index of refraction higher than that of graphene.

Figure 2:
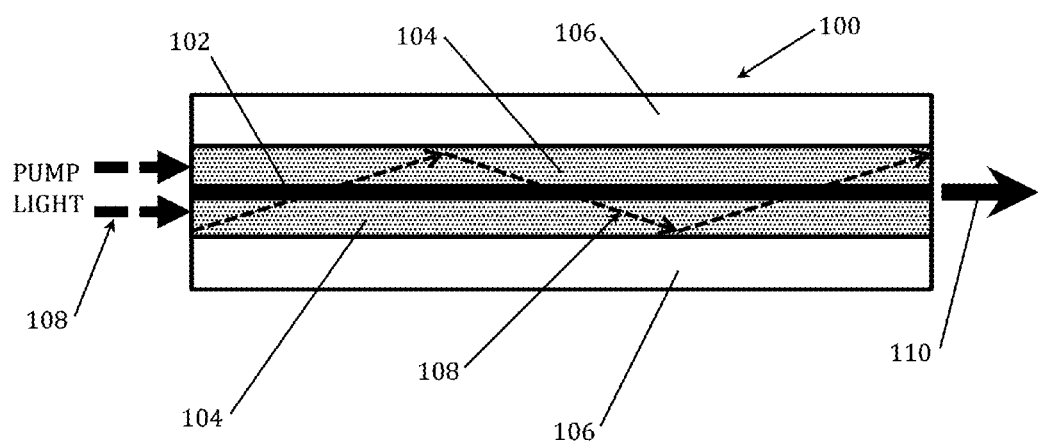
FIG. 2 illustrates a side view of a doped optic fiber for an optic fiber amplifier having graphene cladding.

FIG. 2 illustrates a side view of an optic fiber 100 for an optic fiber amplifier having graphene cladding 106. The optic fiber 100 has a doped inner core 102 and an undoped outer core 104. Doped inner core 102 is commonly made of silica. Undoped outer core 104 is also commonly made of silica. Optic fiber 100 has a dual core structure 102/104. Doped inner core 102 is doped with rare earth elements that are excited by pump light. These rare earth elements lase when they release energy returning to a lower energy state. Undoped outer core 104, also called an inner cladding, is the medium through which pump light 108 is channeled. Cladding 106, also referred to as outer cladding, is formed of graphene. Undoped outer core collects the pump light 108 and guides it along fiber 100. Inner core 102 becomes active by doping it with one or more atomic elements, usually (but not restricted to) rare-earths (RE's), more specifically, the lanthanides that occupy the atomic numbers 57 to 71 of the periodic table. For example, inner core 102 has a dopant such as erbium, ytterbium, neodymium, dysprosium, praseodymium, or thulium. Rare earths use three electrons in bonding to materials such as crystals and glasses to become triply ionized ions. Because they present absorption and emission bands from ultraviolet (UV) to near-infrared (NIR), the materials doped with these become very active in converting the properties of optical signals. Rare earth element doping of optical fibers is discussed more fully in the following technical paper hereby incorporated by reference: Efraín Mejía-Beltrán (2012). *Rare-Earth Doped Optical Fibers, Selected Topics on Optical Fiber Technology*, Dr Moh. Yasin (Ed.), ISBN: 978-953-51-0091-1. The dopant in doped inner core 102 is stimulated to emit radiation 110 by pump light 108. Graphene cladding 106 may be a monolayer of graphene, a bilayer of graphene, or multilayer graphene. Graphene features optic wave properties supporting the functioning of optic fiber 100 as an optic fiber amplifier. Further, graphene cladding 106 exhibits high thermal conductivity supporting heat dissipation from fiber 100 when it is lasing. Optical fiber inner core 102 and outer core 104 are commonly made of crystal quartz ($SiO_2$) that is melted and cooled down such that stays "frozen" in its vitreous state. This disordered pattern of the constituents, Silicon and Oxygen, produce randomly distorted unit cells of the crystal (quartz) to become silica. Other materials may be used for inner core 102 and outer core 104 such as zirconium-fluoride glasses, which are heavy metal fluoride glasses. One group of zirconium-fluoride glasses are ZBLAN glasses, which have a composition of $ZrF_4$—$BaF_2$—$LaF_3$—$AlF_3$—$NaF$. ZBLAN glass is a stable fluoride glass that may used to make optical fiber.

Doped fiber 100 operates effectively as a fiber laser with an optical amplifier in order to amplify an optical signal. Fiber lasers are quasi-three-level systems. A pump photon excites a transition from a ground state to an upper level; the laser transition is a drop from the lowest part of the upper level down into some of the split ground states. Ultraviolet (UV) fiber lasers may, for example, be formed of an inner core 102 made of ZBLAN glass that is doped with thulium (Tm) that emits light having a wavelength of 284 nm, which is in the UV spectrum. UV lasers may also be formed of an inner core 102 made of ZBLAN glass that is doped with neodymium (Nd) that emits light having wavelengths of 380 nm and 410 nm, which are also in the UV spectrum. Ytterbium has center wavelengths ranging from about 1030-1080 nm and can emit in a broader range of wavelengths if pushed. Erbium fiber lasers emit at 1530-1620 nm.

Figure 3:
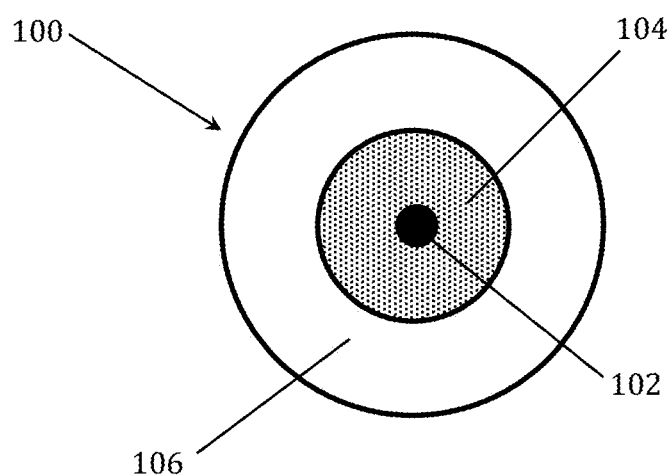
FIG. 3 illustrates an end view of a doped optic fiber for an optic fiber amplifier having graphene cladding.

FIG. 3 illustrates an end view of an optic fiber 100 of an optic fiber amplifier having graphene cladding 106. Note that doped inner core 100 is shown as being circular. Undoped outer core 104 is also shown as being circular. The illustration of undoped outer core 104 being circular is merely exemplary. There are a variety of non-circular geometric configurations for undoped outer core 104 including hexagonal, D-shaped and rectangular.

Figure 4:
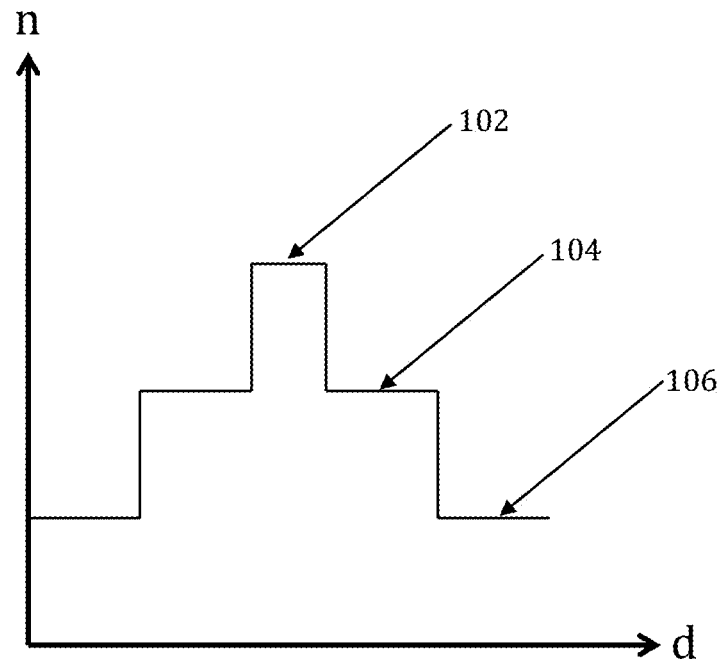
FIG. 4 illustrates an index of refraction profile for a doped optic fiber for an optic fiber amplifier having graphene cladding.
Figure 4:
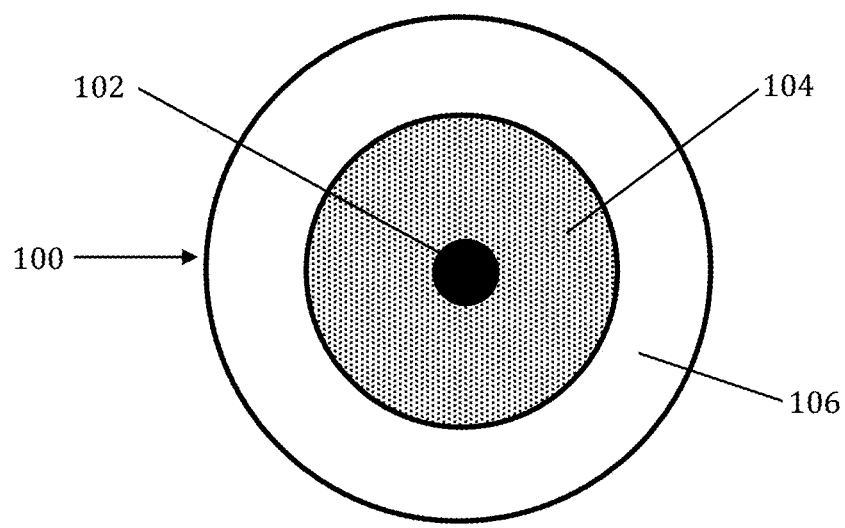

FIG. 4 illustrates an index of refraction profile for an optic fiber 100 of an optic fiber amplifier having graphene cladding 106. Optic fiber 100 includes inner core 102 and outer core 104 encased by graphene cladding 106. The index of refraction profile for fiber 100 is provided above fiber 100. Inner core 102 has the highest index of refraction. Outer core 104 has an index of refraction lower than inner core 102, but higher than cladding 106. Cladding 106 has an index of refraction lower than outer core 104. ZBLAN glass has a refractive index of 1.50. Silica typically has an index of refraction of 1.45. Graphene has a refractive index below 1.5 within the UV spectrum, making it a viable cladding material 106 for an inner core 102 and outer core 104 fiber 100 made of ZBLAN or silica when UV light below approximately 260 nm is used as the laser pump. Table 1 below provides a listing of pump lasers suitable for utilizing silica or ZBLAN for outer core 104 and/or inner core 102 and graphene for cladding 106. In this configuration, inner core 102 is preferably doped with neodymium (Nd).

TABLE 1

| Lasing Medium | Laser Type | Wavelength |
| --- | --- | --- |
| Argon SHG | Gas-Ion/BBO crystal | 257 nm |
| Argon SHG | Gas-Ion/BBO crystal | 250 nm |
| NeCu | Metal Vapor | 248-270 nm |
| Argon SHG | Gas-Ion/BBO crystal | 248 nm |
| KrF | Gas (excimer) | 248 nm |
| Argon SHG | Gas-Ion/BBO crystal | 244 nm |
| Argon SHG | Gas-Ion/BBO crystal | 238 nm |
| Ti: Sapphire (tripled) | Solid State | 235-330 nm |
| Argon SHG | Gas-Ion/BBO crystal | 229 nm |
| HeAg+ | Gas-Ion/BBO crystal | 224.3 nm |
| KrCl | Gas (excimer) | 222 nm |
| Nd: YAG | Solid State | 213 nm |
| ArF | Gas (excimer) | 193 nm |
| $F_2$ | Gas (excimer) | 157 nm |

Figure 5:
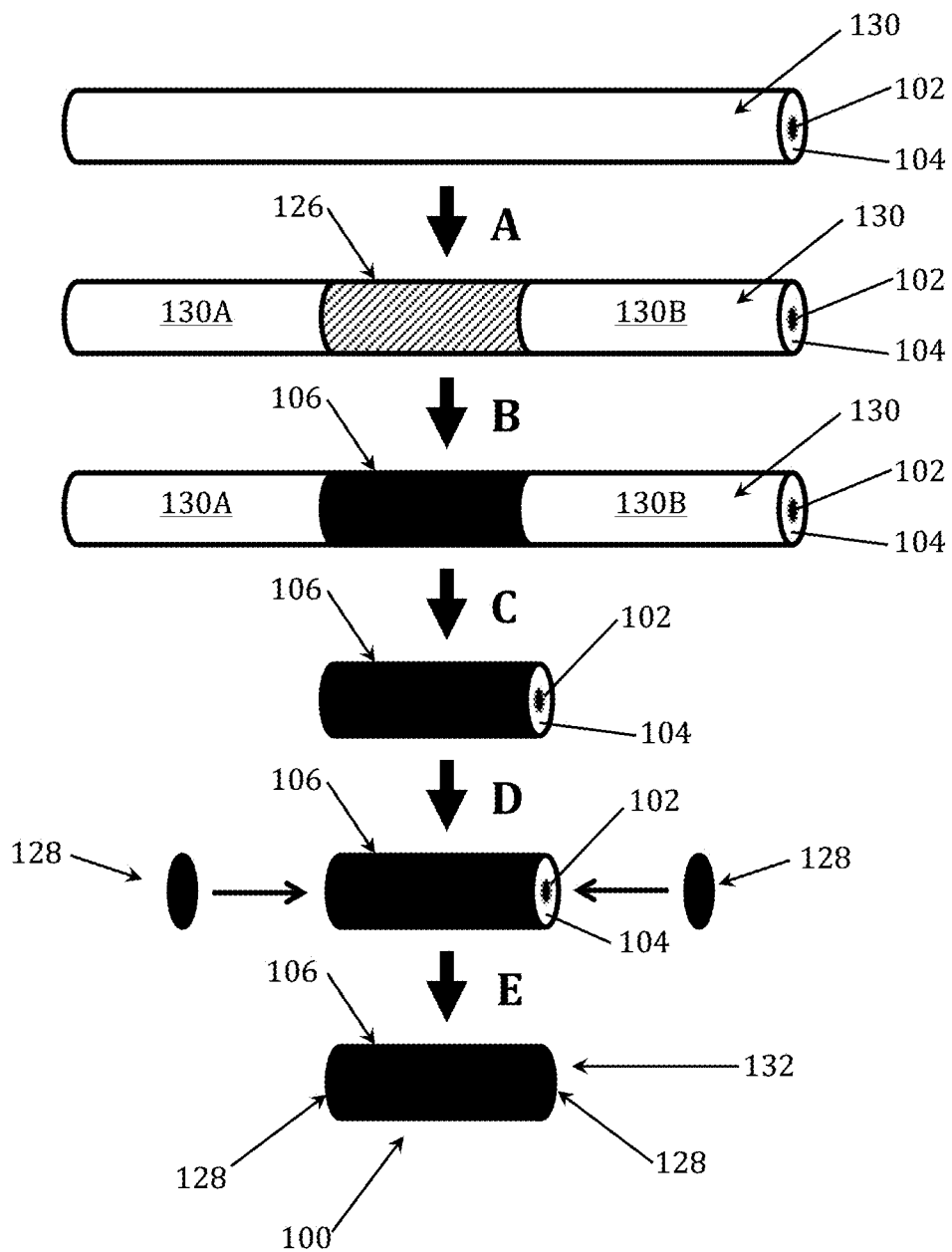
FIG. 5 illustrates a process schematic of fabricating a doped optic fiber for an optic fiber amplifier having an inner core, outer core and encapsulated by a graphene layer, which forms a cladding layer.

FIG. 5 illustrates a process schematic of fabricating an optic fiber 100 having an inner core 102 and outer core 104 encapsulated by a graphene layer 132, which forms a cladding layer 106. Initially, an optic fiber core 130 was prepared and cleaned with alcohol and acetone. Optic fiber inner core 102 may be formed of silica. Optic fiber outer core 104 may also be formed of silica. In this example, as both inner core 102 and outer core 104 are formed of silica, CVD processes may be used to deposit graphene on fiber core 130. The use of silica for inner core 102 and outer core 104 is exemplary. Other materials for optic fiber inner core 102 and outer core 104 may be used. Note that inner core 102 is preferably doped with a material, such as a rare earth element, that emits radiation when excited. For example, inner core 102 has a dopant such as erbium, ytterbium, neodymium, dysprosium, praseodymium, or thulium.

In process step A depicted in FIG. 5, a copper layer 126 is deposited around the middle of optic fiber core 130. Copper layer 126 may be deposited via a sputtering method. One exemplary thickness for copper layer 126 is 1.3 μm. However, any length of copper layer 126 may be created. Copper layer 126 is a sacrificial layer deposited to support the deposition of graphene layer 106 on optic fiber core 130. Alternatively, sacrificial copper film 126 may be evaporated onto optic fiber core 130 through use of an electron-beam evaporation process. Note that optic fiber core regions 130A and 130B are not covered by copper film 126. Next in step B depicted in FIG. 5, optic fiber core 130 with copper layer 126 is placed within a Chemical Vapor Deposition (CVD) chamber. In one exemplary process, under a controlled temperature and pressure of 900° C. and 1 MPa and catalyzed by copper layer 126, a monolayer of graphene 106 was grown on copper layer 126 in 2 hours using $H_2$ and $CH_4$ at 50 sccm (standard cubic centimeters per minute). Multilayer graphene can be grown on optic fiber 130 through longer growth times. Subsequently, the temperature within the CVD chamber was increased to 1020° C. and the pressure was decreased to 100 kPa and held constant for a period of 10 hours during which the copper atoms evaporated off, thereby leaving a graphene cylinder 106 surrounding optic fiber core 130 without any intervening copper layer 126. Silica optic fiber core 130 is resilient to morphological changes at 900-1020° C. required for the CVD growth of high-quality graphene due to the high melting point of silica of 1600° C.

Next, in step C depicted in FIG. 5, bare optic fiber core ends 130A and 130B are cut off and removed from the portion of optic fiber core 130 covered with graphene cylinder 106. In step C depicted in FIG. 5, graphene cylinder 106 covers the length of optic fiber core 130. However, the ends of optic fiber core 130 remain uncovered with graphene. In this step, optic fiber core 130 and graphene cylinder 106 are cleaned with acetone, alcohol and deionized water. In step D depicted in FIG. 5, premade circular graphene films 128 are applied to the ends of optic fiber 130, thereby encapsulating optic fiber core 130 within a graphene capsule formed of graphene cylinder 106 and graphene ends 128. Subsequently in step E depicted in FIG. 5, optic fiber may optionally be exposed to a carbon atmosphere to create carbon-carbon bonds between graphene ends 128 and graphene cylinder 106. Cladding 106 is one or more layers of materials of lower refractive index, in intimate contact with a core material 102 and 104 of higher refractive index. The cladding 106 causes light to be confined to the core 102/104 of the fiber 100 by total internal reflection at the boundary between the two layers. Light propagation in the cladding 106 is suppressed in typical fiber. Some fibers can support cladding modes in which light propagates in the cladding 106 as well as the core 102/104. Due to its strength and flexibility, graphene cylinder 106 functions to provide mechanical support to optic fiber 100. Circular graphene sheets 128 protect the ends of optic fiber core 130 from mechanical damage. Graphene cylinder 106, due to its optic properties, may function as an optic waveguide in combination with core 130.

The above process for forming a graphene capsule around optic fiber core 130 is exemplary. Other processes may be used to form an optic fiber formed of a silica optic fiber inner core 102 and outer core 104 surrounded by a graphene capsule 106 as cladding. For example, CVD may be used to entirely grow a graphene capsule around silica optic fiber core 130. CVD of graphene onto a solid circular rod such as a nanowire or a silica optic fiber core 130 produces a graphene capsule 132 that completely encapsulates silica optic fiber core 130. This graphene capsule 132 is formed of a cylinder of graphene 106 surrounding optic fiber core 130 along its lengths with graphene surfaces 128 covering the two ends of the graphene cylinder 106. The process begins with evaporating a sacrificial copper film 126 onto the silica optic fiber core 130 that also covers the ends of core 130. An electron-beam evaporation process is used to deposit the copper film 126 onto the silica optic fiber core 130. Next, silica optic fiber core 130 having sacrificial copper layer 126 is inserted into a CVD chamber. Silica optic fiber core 130 is heated to 1000° C. CVD of graphene is the performed on optic fiber core 130 with durations varying from 15 min up to 7 h at 1000° C. Given the fact that that the melting temperature of the copper is ~1084° C., along with the high temperature during the growth of ~1000° C., and the low pressure in the chamber, 100-500 mTorr, copper film 126 de-wets and evaporates during the CVD process. Ethylene ($C_2H_4$) or $CH_4$ is introduced into the CVD chamber as the carbon-containing precursor, in addition to the $H_2$/Ar flow. The precursor feeding time, typically in the order of a few to tens of seconds, determines the number of layers of graphene grown. The sample may then be cooled to room temperature within 5 min in a flow of 133 sccm Ar at 20 Torr chamber pressure. Silica optic fiber core 130 is resilient to morphological changes at ~1000° C. required for the CVD growth of high-quality graphene due to the high melting point of silica of 1600° C. During this CVD process, sacrificial copper layer 126 de-wets and evaporates exposing silica optic fiber core 130 directly to graphene layer 106 and 128. In this process, graphene ends 128 are formed on optic fiber core 130 through CVD deposition.

A monolayer of graphene 132 may be formed on optic fiber core 130. Alternatively, multilayer graphene 132 may be formed on optic fiber core 130. The number of graphene sheets is determined by the growth time and is independent of tube diameter and tube length. As a consequence of this process, a silica optic fiber core 130 is encapsulated within a graphene capsule 132. Graphene capsule 132 provides mechanical strength to optic fiber core 130. It is contemplated that the above discussed CVD process of graphene deposition may occur on conventional silica optic fibers having diameters of 8-10 μm, 50 μm, 62.5 μm, and 100 μm. These diameter ranges are merely exemplary and are non-limiting. Another process of forming a graphene capsule 132 can be performed through wrapping optic fiber core 130 with a prefabricated sheet of graphene, thereby forming a graphene cylinder 106 around optic fiber core 130. Circular graphene ends 128 can then be adhered to the ends of optic fiber core 130, thereby encapsulating optic fiber core 130. Carbon-carbon bonds can be formed between graphene cylinder 106 and circular graphene ends 128 by exposure to a carbon atmosphere.

Processes for creating tubular graphene structures, also known as carbon nanotubes, have been demonstrated on 70 nm Nickel (Ni) nanowires as described in the following publication, hereby incorporated by reference: Rui Wang, Yufeng Hao, Ziqian Wang, Hao Gong, and John T. L. Thong in *Large-Diameter Graphene Nanotubes Synthesized Using Ni Nanowire Templates*, Nano Lett. 2010, 10, 4844-4850, American Chemical Society, Oct. 28, 2010. However, unlike the process disclosed by Wang utilizing a sacrificial Ni nanowire template, the present invention utilizes a silica optic fiber core 130 that is retained as an essential component of the optic fiber 100 contained within a cylindrical graphene sheet 106, i.e. a carbon nanotube, capped at both ends by sheets 128 to encapsulate optic fiber core 130 with graphene capsule 128. Processes for direct chemical vapor deposition of graphene on dielectric surfaces such as silica are described in the following publication, hereby incorporated by reference: Ariel Ismach, Clara Druzgalski, Samuel Penwell, Adam Schwartzberg, Maxwell Zheng, Ali Javey, Jeffrey Bokor, and Yuegang Zhang, *Direct Chemical Vapor Deposition of Graphene on Dielectric Surfaces*, Nano Lett. 2010, 10, 1542-1548, American Chemical Society, Apr. 2, 2010.

In another exemplary process, graphene capsule 132 may be deposited directly on to optic fiber core 130 without the use of a metal catalyst, such as sacrificial copper layer 126. The CVD is performed in an atmospheric pressure hot-wall quartz tube furnace. $CH_4$ is used as a carbon precursor gas, mixed with auxiliary reduction ($H_2$) and carrier (Ar) gases. The optic fiber core 100 is heated to 1000° C. (at a rate of 30° C./min) under $H_2$ (50 sccm) and Ar (1000 sccm) atmosphere and kept at 1000° C. for 3 min. Then, 300 sccm $CH_4$ is introduced to initiate the formation of graphene. The typical growth time is 30-60 min. After the deposition, the $CH_4$ flow is stopped, leaving other gases to flow for further 3 min to remove residual reaction gases before allowing the chamber to naturally cool to room temperature (20° C./min) in the same $H_2$—Ar atmosphere. The graphene layer 106 can also be deposited directly on $SiO_2$ by using other hydrocarbon precursors, such as $C_2H_2$, showing the generality of the process. The growth of graphene directly on a silica substrate is reported in the following publication, hereby incorporated by reference: Jie Sun, Niclas Lindvall, Matthew T. Cole, Teng Wang, Tim J. Booth, Peter Bøggild, Kenneth B. K. Teo, Johan Liu, and August Yurgens. *Controllable chemical vapor deposition of large area uniform nanocrystalline graphene directly on silicon dioxide*. Journal of Applied Physics 111, 044103 (2012).

While optic fiber core 130 may be formed of silica, other glasses with higher indicies of refraction may be used for optic fiber inner core 102 and outer core 104. For example, inner core 102 and outer core 104 may be made from chalcogenide glass. Chalcogenide glasses are based on the chalcogen elements S, Se, and Te. These glasses are formed by the addition of other elements such as Ge, As, Sb, and Ga. These glasses are low-phonon-energy materials and are generally transparent from the visible up to the infrared. Chalcogenide glasses can be doped by rare-earth elements such as Er, Nd and Pr. One class of chalcogenide glasses that may be used for inner core 102 and outer core 104 are halide-chalcogenide glasses. Halide-chalcogenide glasses have properties that make them suitable for optical fibers and they are reported to have indices of refraction n ranging from 2.54 to 2.87. The processes discussed above are not compatible with halide-chalcogenide glasses due to the high temperatures of the CVD process. Halide-chalcogenide glasses have a melting temperature of 378° C. and would not survive a CVD process at 900-1020° C. However, a variety of low-temperature graphene synthesis techniques are known with very low thermal budgets. With these techniques, the halide-chalcogenide glasses are heated to temperatures around 300° C. for graphene growth. For example, a halide-chalcogenide optic fiber core 130 may be heated in a CVD chamber to 300° C. and exposed to a benzene precursor as the carbon source to create a monolayer of graphene. This process is reported in the following publication, hereby incorporated by reference: Zhancheng Li, Ping Wu, Chenxi Wang, Xiaodong Fan, Wenhua Zhang, Xiaofang Zhai, Changgan Zeng, Zhenyu Li, Jinlong Yang, and Jianguo Hou. *Low-Temperature Growth of Graphene by Chemical Vapor Deposition Using Solid and Liquid Carbon Sources.* ACSNANO VOL. 5, NO. 4, 3385-3390, 2011. In an alternative low temperature process, graphene film may be synthesized on a halide-chalcogenide optic fiber core 130 at 280° C. utilizing a microwave plasma treatment in combination with PolyMethylMethacrylate (PMMA). With this process, a layer of PMMA is spin-coated onto a halide-chalcogenide optic fiber core 130 at room temperature. The PMMA coated halide-chalcogenide optic fiber core 130 is then inserted into a slot antenna-type microwave plasma CVD system for microwave plasma treatment at 280° C. The plasma treatment time is 30 seconds. This plasma treatment process is disclosed in the following publication, hereby incorporated by reference: Takatoshi Yamada, Masatou Ishihara, and Masataka Hasegawa. *Low Temperature Graphene Synthesis from Poly(methyl methacrylate) Using Microwave Plasma Treatment.* Applied Physics Express 6 (2013) 115102-1. Another low temperature method of coating optic fiber cores with graphene is to wrap optic fiber cores with premade graphene sheets. Atomic forces adhere the premade graphene sheets to the optic fiber. A long rectangular sheet of premade graphene would wrap the length of the optic fiber in a graphene tube. A pair of premade circular graphene end sheets would cover the ends of the optic fiber. The graphene sheets may be made for example by CVD deposition of graphene onto copper sheets. A preferred embodiment for amplifier assembly 112 is provided below in TABLE 2 utilizing chalcogenide glass.

TABLE 2

| Pump Laser 114/116 | Cladding Material 106 | Outer Core Material 104 | Inner Core Material 102 | Dopant for Inner Core 102 | Emitted Laser Frequency |
|---|---|---|---|---|---|
| Ti: Sapphire laser at 815 nm | Graphene | Chalcogenide Glass Fiber | Chalcogenide Glass Fiber | Neodymium (Nd) | Infra-red 1080 nm |
| Solid-State Laser at 1480 nm | Graphene | Chalcogenide Glass Fiber | Chalcogenide Glass Fiber | Erbium (Er) | Infra-red 980 nm |

Figure 6:
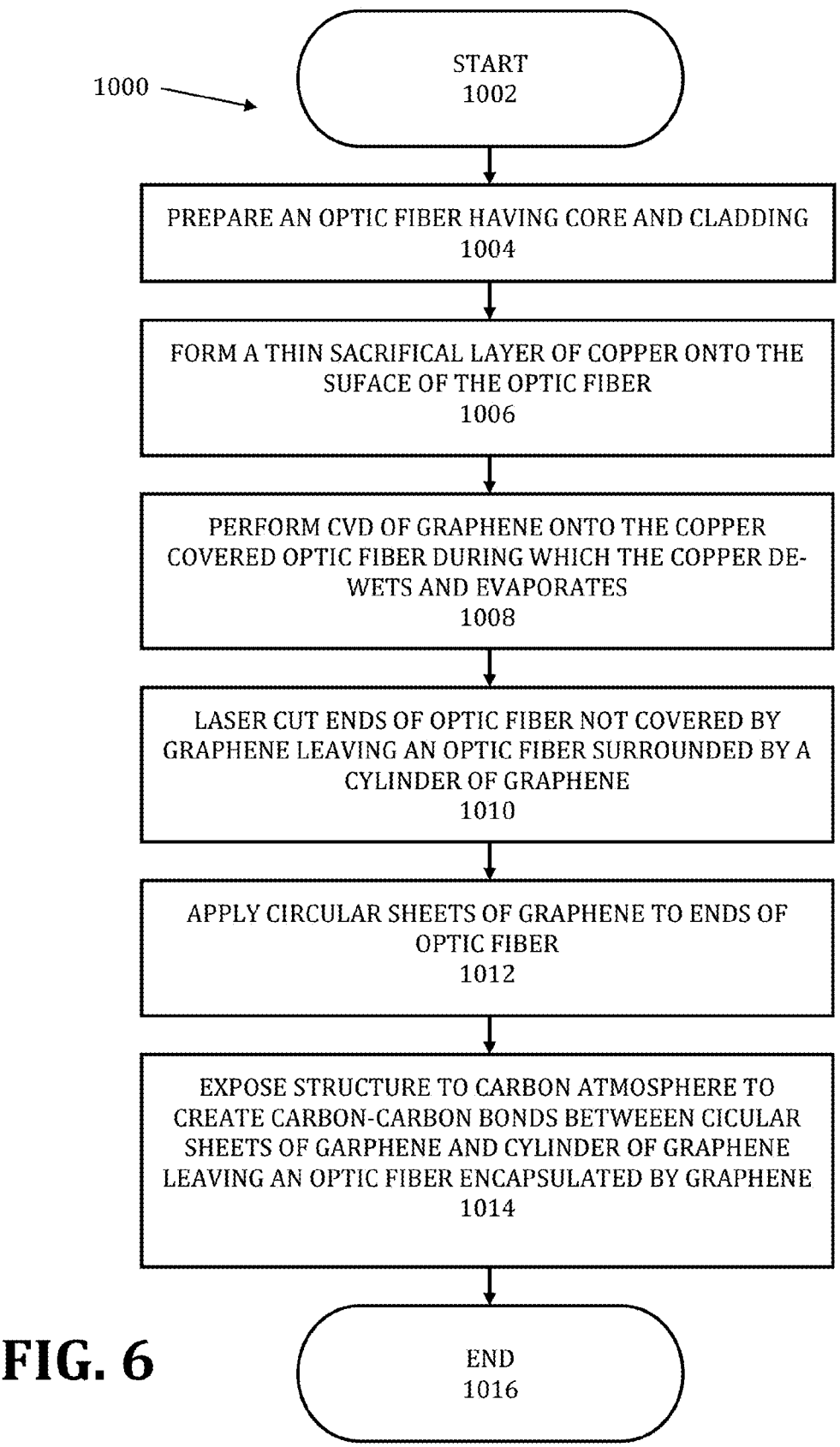
FIG. 6 illustrates a flow chart depicting a process of fabricating a doped optic fiber for an optic fiber amplifier having a core and cladding formed by graphene.

FIG. 6 illustrates a flow chart 1000 depicting an exemplary process of fabricating an optic fiber 100 having an inner core 102, outer core 104 and graphene cladding 106 that forms mechanical support and an optic waveguide around core 130. The process begins with START 1002. An optic fiber having a core and cladding made of silica is prepared and cleaned with acetone and alcohol in step 1004. In step 1006, a thin sacrificial layer of copper 126 is formed onto the surface of optic fiber core 130. Next in step 1008, a CVD process is performed depositing graphene layer 106 onto optic fiber core 130 during which the sacrificial copper layer 126 evaporates. Then in step 1010, the ends of optic fiber core 130 not covered by graphene cylinder 106 are cut for example, by a laser. In this step, optic fiber core 130 and graphene cylinder 106 are cleaned. In step 1012, circular sheets of graphene 128 are applied to the ends of optic fiber core 130, thereby forming a graphene capsule 132 encapsulating optic fiber core 130. In step 1014, exposing graphene sheets 128 and graphene cylinder 106 to a carbon atmosphere creates carbon-carbon bonds between graphene cylinder 106 and graphene sheets 128, thereby further creating a graphene capsule 132 encapsulating optic fiber core 130. The process ENDS with step 1016.

Figure 7:
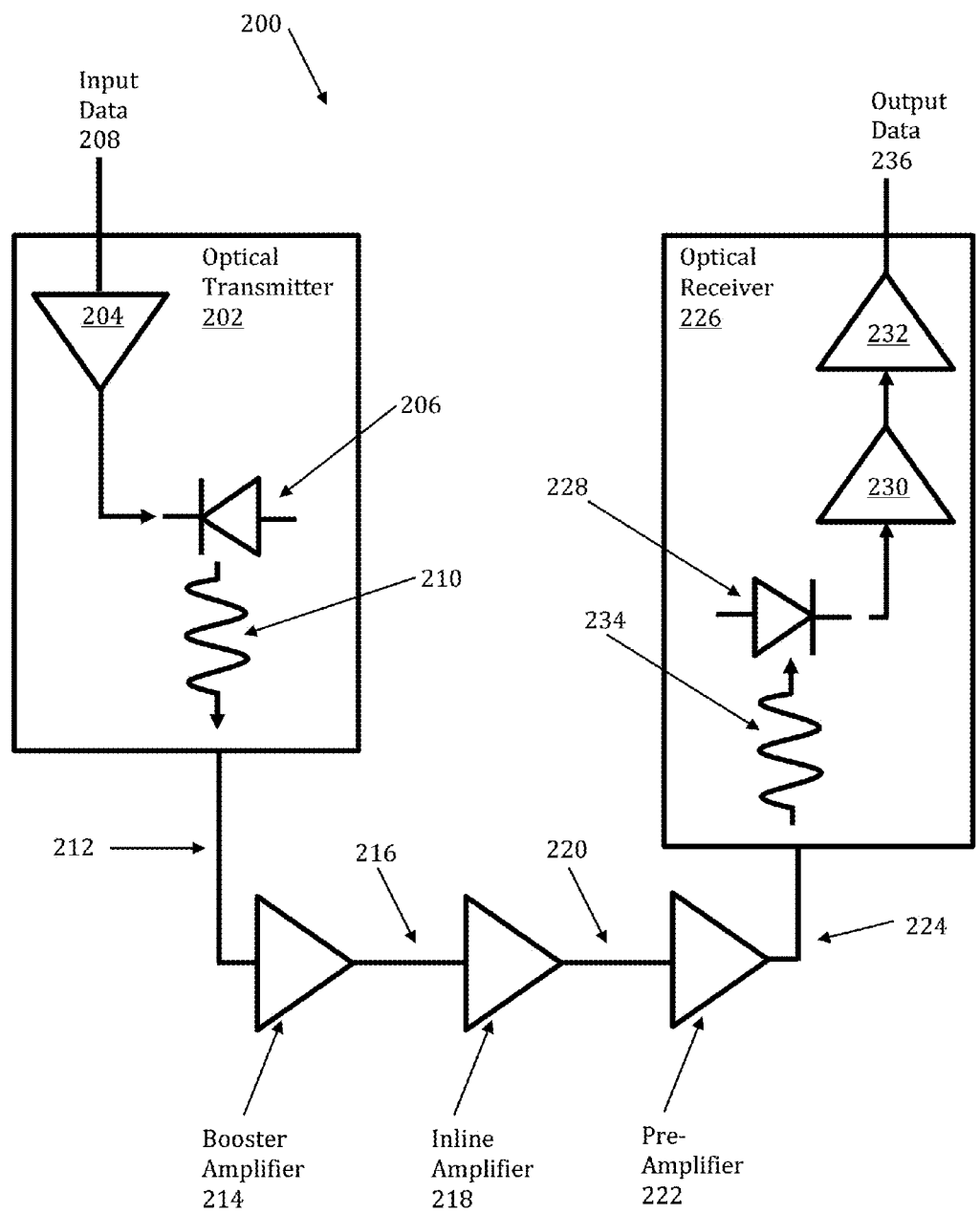
FIG. 7 illustrates an optic fiber communications system containing optic fiber amplifiers.

FIG. 7 illustrates an optic fiber communications system 200 containing optic fiber amplifiers 214, 218 and 222. Optic fiber communications system 200 includes an optical transmitter 202 that has a driver 204 that operates photodiode 206. Driver 204 receives input data 208 and correspondingly causes photodiode 206 to emit optic data signal 210. Optic data signal 210 contains input data 208. Optic signal 210 is carried by an optic fiber 212 to booster amplifier 214. Optic fiber 212 may be a conventional optic fiber. Alternatively, optic fiber 212 may be an optic fiber 100 that is encapsulated within graphene capsule 132, but does not have a doped inner core 102. Booster amplifier 214 is used to increase the optical output of optical transmitter 202 just before optic signal 210 enters a long optical fiber data link 216. Optic fiber data link 216 may be a conventional optic fiber. Alternatively, optic fiber data link 216 may be an optic fiber 100 that is encapsulated within graphene capsule 132, but does not have a doped inner core 102.

Optical signal 210 is attenuated as it travels along optical fiber data link 216. Inline amplifier 218 is utilized to restore and regenerate optical signal 210 to its initial optical power. After optical signal 210 is amplified by inline amplifier 218, it is transmitted along optic fiber data link 220 to pre-amplifier 222. Optic fiber data link 220 may be a conventional optic fiber. Alternatively, optic fiber data link 220 may be an optic fiber 100 that is encapsulated within graphene capsule 132, but does not have a doped inner core 102. Pre-amplifier 222 is used at the end of optic fiber data link 220 in order to increase the power of optical signal 210 for reception by optical receiver 226. Optical receiver 226 is coupled to pre-amplifier 222 by optic fiber 224. Optic fiber 224 may be a conventional optic fiber. Alternatively, optic fiber 224 may be an optic fiber 100 that is encapsulated within graphene capsule 132, but does not have a doped inner core 102.

Optical receiver 226 includes a photodetector 228 that receives optic signal 234 and converts it to an electrical signal that is boosted by a transimpedance amplifier 230. Optic signal 234 is optic signal 210 that has been amplified by amplifiers 214, 218 and 222 and transmitted along optic fibers 212, 216, 220 and 224. Transimpedance amplifier 230 is a current-to-voltage converter that can be used to amplify the signal of photodetector 228. Post-amplifier 232 amplifies the signal from transimpedance amplifier 230 further to produce data output 236.

Amplifiers 214, 218 and 222 are optical amplifiers in that they amplify the optical signal directly without converting the optical signal to an electrical signal. Amplifiers 214, 218 and 222 may be formed of a doped fiber amplifier illustrated in FIGS. 8 and 9, or a Raman optical fiber amplifier illustrated in FIG. 10.

Figure 8:
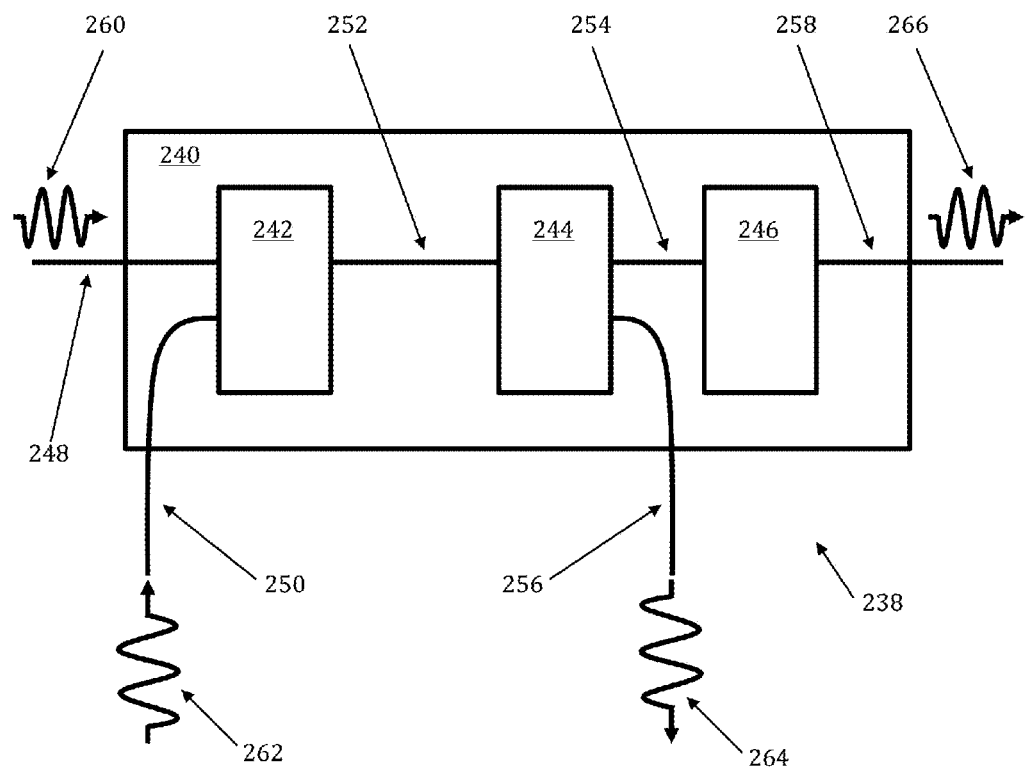
FIG. 8 illustrates an optical amplifier with a doped optical fiber in which the optical signal and optical pump are co-propagating.

FIG. 8 illustrates an optical amplifier 238 with a doped optical fiber 252 in which the optical signal 260 and optical pump 262 are co-propagating. Optical amplifier 238 may function as a booster amplifier 214, an inline amplifier 218 or as a pre-amplifier 222. Optical amplifier 238 includes an input optical fiber line 248 that carries optical signal 260. Input optical fiber line 248 could be fiber 212, 216 or 220 from FIG. 7. Optical amplifier 240 includes optical coupler 242 and optical coupler 244. Optical coupler 242 and 244 are Wavelength Division Multiplexers (WDMs). Optical coupler 242 is coupled to optical pump 250. Optical coupler 242 is connected to optical coupler 244 by doped optic fiber 252. Doped optic fiber 252 is an optic fiber laser whose function amplifies signal 260 into signal 266. Residual pump 256 is coupled to optical coupler 244. Coupler 244 and residual pump 256 are provided to remove residual pump light 264 from fiber 254 to maximize the quality of the amplified signal 260 as it leaves doped fiber 252 and propagates through fiber 254. An inline optical isolator and filter 246 is provided after optical coupler 244. Optical signal 210 travels from optical coupler 244 to inline optical isolator and filter 246 via optic fiber 254. Amplified output signal 266 is provided on output optic fiber line 258. Optic fibers 248, 254 and 258 may all be optic fibers 100 that are encapsulated within a graphene capsule 132, but lack a doped inner core 102.

Optical pumps 250 and 256 utilize optical pump signals 262 and 264 to excite the doped inner core 102 of doped optic fiber 252 causing it to lase. Doped fiber amplifier 238 is an optical amplifier that uses doped optical fiber 252 as a gain medium to amplify optical signal 260. Optical pumps 250 and 256, together with couplers 242 and 244, along with doped fiber 252 function as an optical laser. Signal 260 and optical pump signal 262 are multiplexed into doped fiber 252. Signal 260 is amplified into signal 266 through interaction with the doping ions within doped fiber 252. A variety of rare earth elements may be used to dope fiber 252. The most common example of a doped fiber 252 is an erbium doped fiber, where the core of a silica fiber is doped with trivalent erbium ions and can be efficiently pumped with a laser at a wavelength of 980 nm or 1,480 nm, and exhibits gain in the 1,550 nm region. The use of erbium is merely exemplary. Thulium, Praseodymium, and Ytterbium may also be used to dope fiber 252.

A relatively high-powered beam of light 262 is mixed with input signal 260 using wavelength selective coupler 242. Input signal 260 and excitation light 262 are commonly at significantly different wavelengths. The mixed light is guided into a section of fiber 252 doped with rare earth elements in inner core 102. This high-powered light beam 262 excites the rare earth dopant in core 102 to a higher-energy state. When the photons belonging to signal 260 meet the excited rare earth atoms in core 102 of fiber 252, the rare earth atoms give up some of their energy to signal 260 and return to their lower-energy state. The rare earth atoms in returning to a lower energy state gives up its energy in the form of additional photons that are exactly in the same phase and direction as signal 260, thereby amplifying it. So signal 260 is amplified along its direction of travel only. When the rare earth atoms "lase," it gives up its energy in the same direction and phase as the incoming light with signal 260. Thus, the additional signal power from the lasing of fiber 252 is guided in the same fiber mode as incoming signal 252.

WDMs 242 and 244 multiplexes a number of optical carrier signals onto a single optical fiber by using different wavelengths (i.e., colors) of laser light. WDM 242 multiplexes signal 260 from fiber 248 and signal 262 from pump 250 into doped fiber 252. WDM 244 multiplexes signals 264 and 260 from fiber 252 with pump 256 and fiber 254. This technique enables bidirectional communications over one strand of fiber, as well as multiplication of capacity. Inline optical isolator and filter 246 functions to remove further pump light from fiber 254 to ensure a high quality amplified signal 266 propagates along fiber 258. Optical isolator 246 is an optical component that allows the transmission of light in one direction only. Optical isolator 246 prevents unwanted feedback into doped fiber 252, which is an optical oscillator/laser cavity. The operation of isolator 246 depends on the Faraday effect. Optical filter 246 transmits light at the wavelength of signal 260/266 and blocks the remaining light frequencies. Thus, signal 260 is amplified by the lasing of doped fiber 252 into signal 266. Optical amplifier 238 is a co-propagating amplifier due to the fact that optical pumps 262 and 264 propagate light in the same direction as signal 260/266. Signal 266 is an optical signal that is amplified from signal 260 using a co-propagating optical pump 250. Co-propagating optical amplifier 238 produces less output power and less noise than a counter-propagating optical amplifier 268 shown in FIG. 9.

Figure 9:
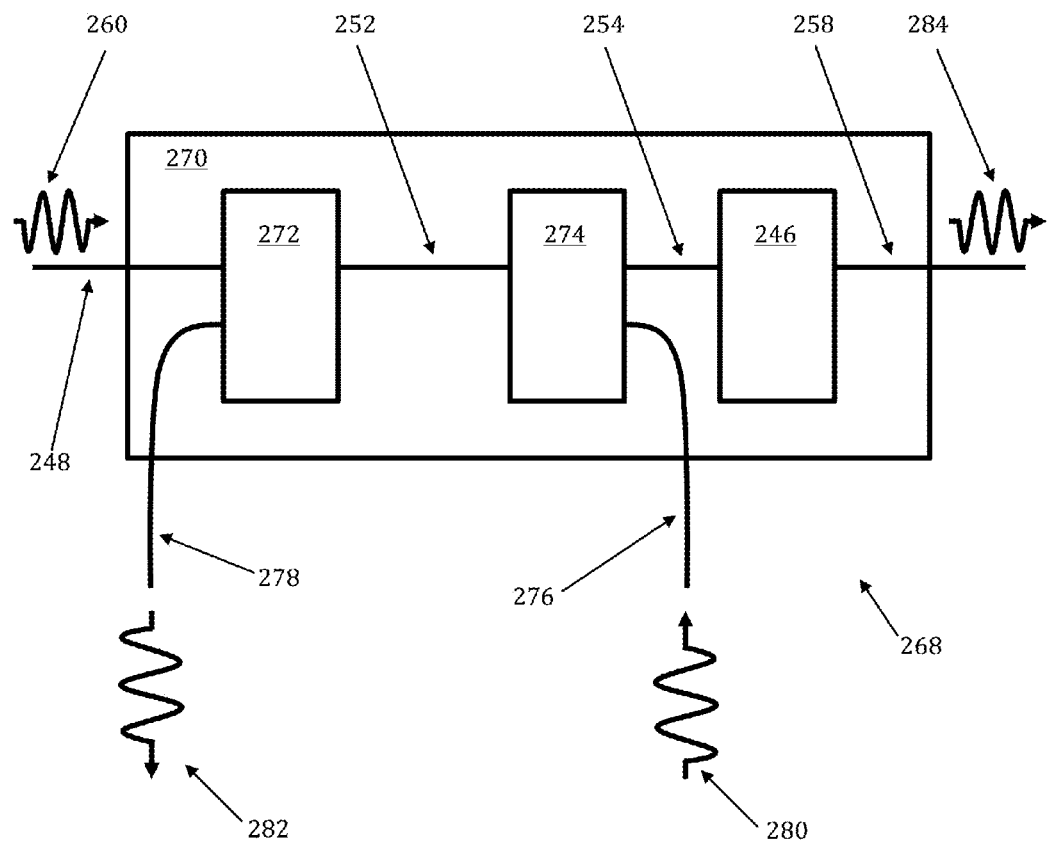
FIG. 9 illustrates an optical amplifier with a doped optical fiber in which the optical signal and optical pump are counter-propagating.

FIG. 9 illustrates an optical amplifier 268 with a doped optical fiber 252 in which optical signal 260 and optical pump 276 are counter-propagating. In counter-propagating optical amplifier 268, pump light 280 is counter-propagating to optical signal 260. Counter-propagating optical amplifier 268 has more noise and higher output power than co-propagating optical amplifier 238 shown in FIG. 8. Input signal 260 is carried into optical amplifier 270 by optic fiber 248. Optic amplifier 270 includes couplers 272 and 274. Optical pump 276 injects light 280 into doped fiber 252 to excite the rare earth elements that dope the inner core 102 of fiber 252. Residual pump light 282 is extracted from doped fiber 252 by residual pump 278.

Couplers 272 and 274 are Wavelength Division Multiplexers (WDMs). Coupler 274 optically couples optical pump 276 to doped fiber 252 and fiber 254. Optical coupler 272 couples residual pump 272 to input fiber 248 and doped fiber 252. Residual pump 278 removes residual pump light 282 from doped fiber 252. Note that pump light 280 propagates counter to signal light 260.

Inline optical isolator and filter 246 functions to remove further pump light from fiber 254 to ensure a high quality amplified signal 284 propagates along fiber 258. Optical isolator 246 is an optical component that allows the transmission of light in one direction only. Optical isolator 246 prevents unwanted feedback into doped fiber 252, which is an optical oscillator/laser cavity. The operation of isolator 246 depends on the Faraday effect. Optical filter 246 transmits light at the wavelength of signal 260/284 and blocks the remaining light frequencies.

Optical signal 284 is an amplified version of signal 260 that is amplified by counter-propagating pump light 280/282. Optic fibers 248, 254 and 258 may all be optic fibers 100 that are encapsulated within graphene capsule 132, but lack a doped inner core 102. Optical amplifier 268 may function as a booster amplifier 214, an inline amplifier 218 or as a pre-amplifier 222.

Doped fiber amplifier 238/268 is formed of a doped optic fiber 252. Doped optic fiber 252 has a doped inner core 102 and an undoped outer core 104 surrounding the doped inner core 102. A graphene cylinder 106 surrounds the undoped outer core 104. Graphene cylinder 106 may be formed of a monolayer of graphene. Graphene cylinder 106 may be formed of multilayer graphene. Graphene cylinder 106 may be deposited onto said undoped outer core 104 through a Chemical Vapor Deposition (CVD) process. Inner core 102 may be doped with a rare earth element. For example, inner core 102 may be doped with erbium, ytterbium, neodymium, dysprosium, praseodymium, or thulium. Doped fiber amplifier 238/268 may also include an optical pump 250/276 that excites the rare earth element to a higher energy state to lase and amplify an optic signal 260. Doped fiber 252 is the gain medium for the optical amplifier 238/268. Optical pump 250 is co-propagating to optic signal 260. Optical pump 276 is counter-propagating to optic signal 260.

Doped fiber amplifier 238/268 is disclosed that is formed of doped optic fiber 252. Doped optic fiber 252 has a doped inner core 102 and an undoped outer core 104 surrounding doped inner core 102. A graphene capsule 132 encapsulates undoped outer core 104. Inner core 102 is doped with a rare earth element. The rare earth element may be erbium, ytterbium, neodymium, dysprosium, praseodymium, and thulium. Doped fiber amplifier 238/268 may also include an optical pump 250/276 that excites the rare earth element to a higher energy state to lase and amplify an optic signal. Doped fiber 252 is the gain medium for the optical amplifier 238/268.

Figure 10:
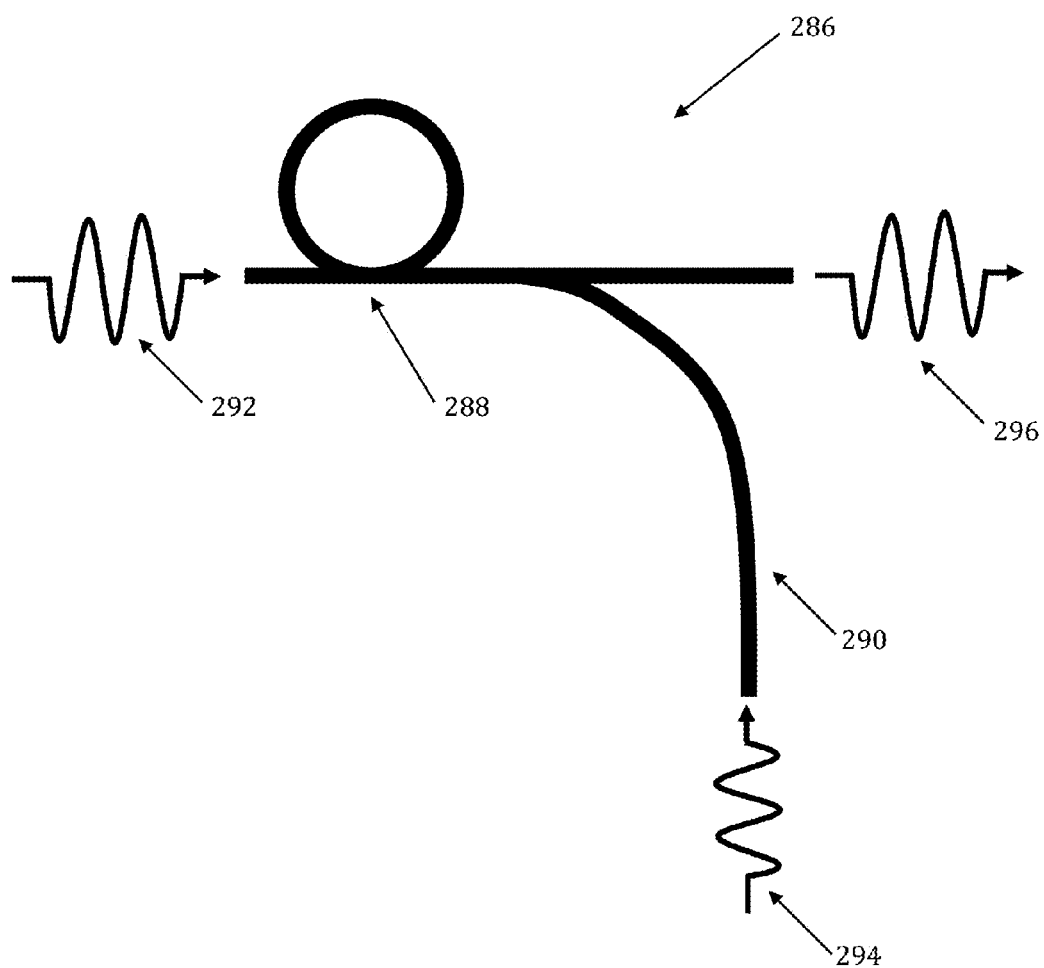
FIG. 10 illustrates a Raman optical fiber amplifier formed of a optic fiber encapsulated by graphene.

FIG. 10 illustrates a Raman optical fiber amplifier 286. The gain medium of Raman optical fiber amplifier 286 is an undoped optical fiber 288. Optical fiber 288 does not have an inner core 102 that is doped with a rare earth element. Optical fiber 288 does have an undoped core 104 that is encapsulated by a graphene capsule 132. Power is transferred to input signal 292 for amplification by a nonlinear process known as the Raman effect. Power to supply this optical gain is supplied by optical pump 290. The optical gain in Raman amplifier 286 is distributed over a long span of optical fiber 288. Typically, light 294 from optical pump 290 is introduced at the end of a length of fiber 288 in order to provide optical gain that increases towards the end of fiber 288. In this way, a Raman amplifier 286 can be combined with a doped fiber amplifier 238 or 268 that functions as a booster 214 or inline amplifier 218 to produce a more uniform power profile along the length of fiber 212/216/220/224 between optical transmitter 202 and optical receiver 226.

Optic fiber amplifier 286 is formed of an optic fiber 288 encapsulated by a graphene capsule 132. Optic fiber amplifier 286 also has an optical pump 290 coupled to optic fiber 288. An optic signal 292 carried by optic fiber 288 is amplified optically through a Raman effect by optical pump 290 to form amplified signal 296. Graphene capsule 132 may be formed of a monolayer of graphene. Graphene capsule 132 may be formed of multilayer graphene. Graphene capsule 132 may be deposited onto said undoped outer core trough a Chemical Vapor Deposition (CVD) process. Optic fiber 288 encapsulated by graphene capsule 132 is the gain medium for optic fiber amplifier 286.

Figure 11:
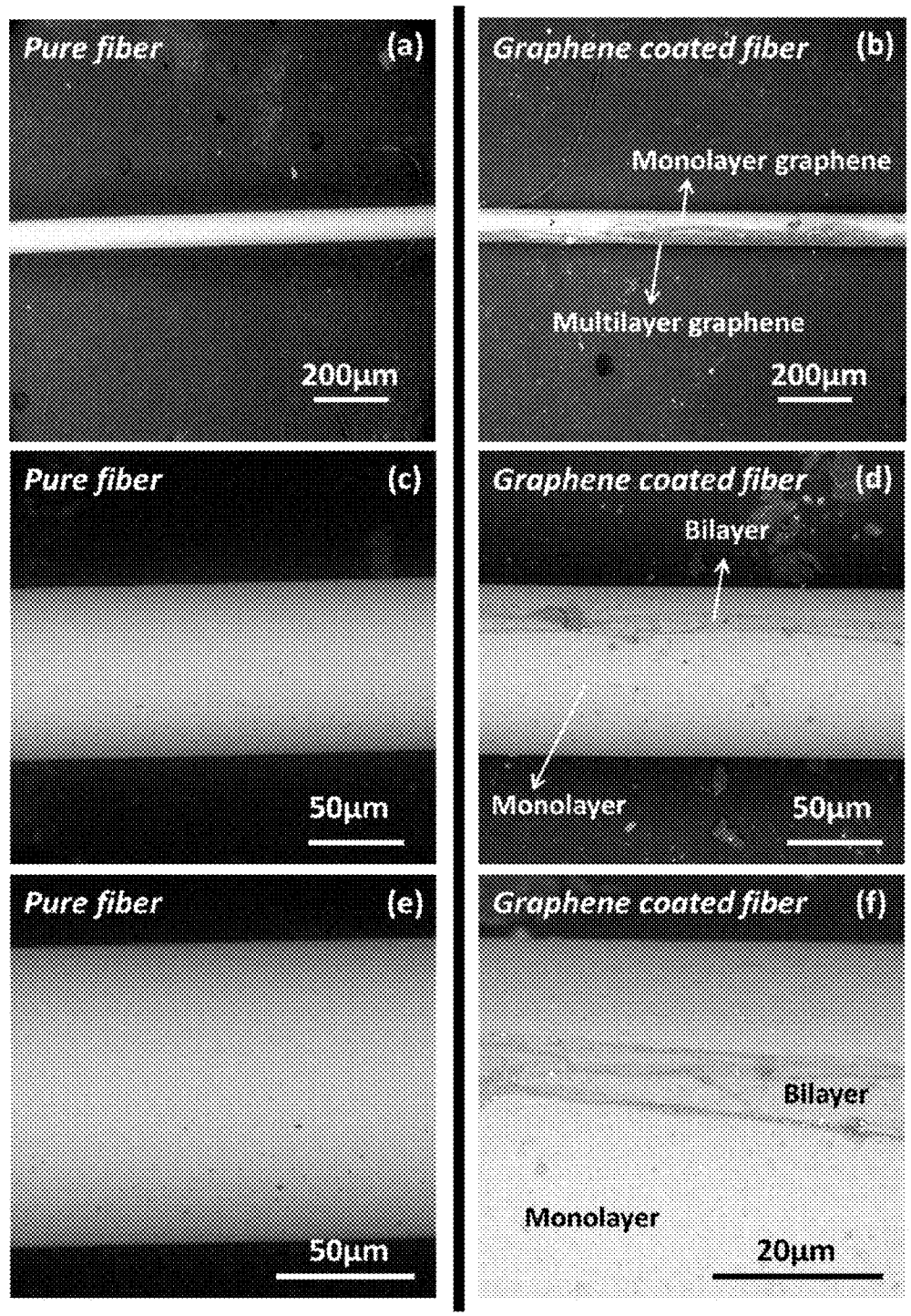
FIG. 11 illustrates Scanning Electron Microscope (SEM) images of an optic fiber that is not coated with graphene adjacent to an optic fiber that is coated with graphene at three different resolutions.

FIG. 11 illustrates Scanning Electron Microscope (SEM) images of a pure optic fiber that is not coated with graphene adjacent to an optic fiber that is coated with graphene at three different resolutions. FIG. 11(*a*) illustrates an SEM image of a pure silica optic fiber that is not coated with graphene at a magnification of 150×. FIG. 11(*b*) illustrates an SEM image of an optic fiber coated with a graphene cylinder at a magnification of 150×. The graphene cylinder is a monolayer of graphene in portions and multilayer graphene in other portions. The graphene coated areas are a bit darker than the pure silica fiber, particularly in the areas where the graphene is multilayer. FIG. 11(*c*) illustrates an SEM image of a pure silica optic fiber that is not coated with graphene at a magnification of 800×. FIG. 11(*d*) illustrates an SEM image of an optic fiber coated with a graphene cylinder at a magnification of 800×. In FIG. 11(*d*), it can be seen that the graphene conforms highly to the contours of the optic fiber. The darker areas of graphene indicate that monolayer graphene may be overlapped to form bi-layer or multilayer graphene. FIG. 11(*e*) illustrates an SEM zoomed-in image of a pure silica optic fiber that is not coated with graphene at a magnification of 800×. FIG. 11(*f*) illustrates an SEM image of an optic fiber coated with a graphene cylinder at a magnification of 1200×. At this resolution, it can be seen in FIG. 11(*f*) that the surface of the silica fiber is very clean and smooth and covered with a highly conforming layer of graphene. In FIG. 11(*f*), graphene layer is in portions a monolayer and in portions a bi-layer, as evidenced by the darker wrinkled areas of graphene.

Figure 12:
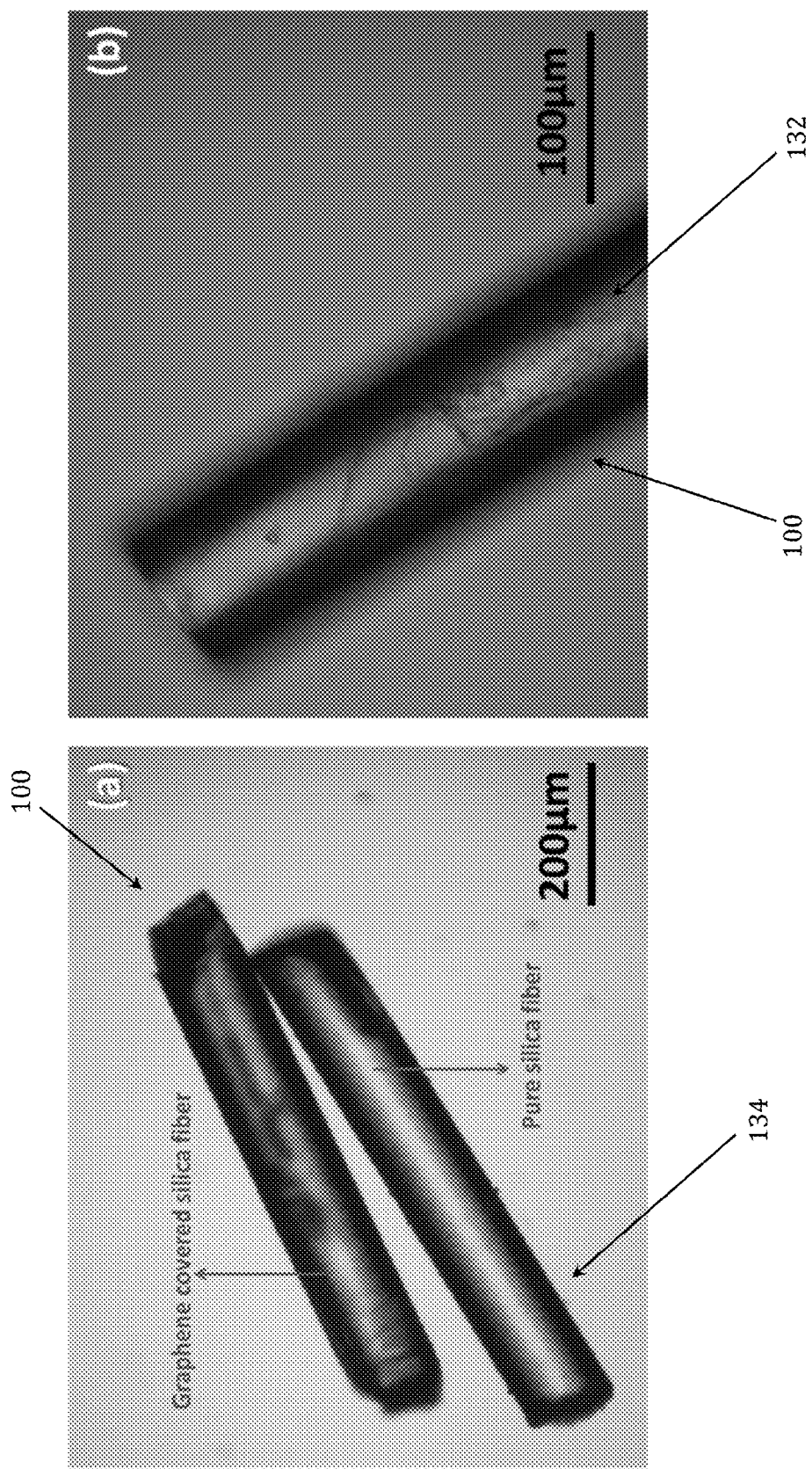
FIG. 12 illustrates an (a) Optical Microscope (OPM) image of a graphene covered silica fiber adjacent to a pure silica fiber not coated with graphene along with a (b) higher resolution OPM image of a graphene coated silica fiber.

FIG. 12 illustrates an (a) Optical Microscope (OPM) image of a graphene covered silica fiber 100 adjacent to a pure silica fiber 134 not coated with graphene along with a (b) higher resolution OPM image of a graphene coated silica fiber 100. In FIG. 12(*a*), a graphene capsule 132 encapsulates silica optic fiber 100. It is observed that the graphene encapsulated optic fiber 100 is darker in color than the pure silica fiber 134 below it that is not covered with graphene. In addition, the pure silica fiber 134 that is not covered with graphene has a smoother appearing surface than the graphene encapsulated fiber that shows the various layers of the graphene coating 132. In FIG. 12(*b*), graphene encapsulated optic fiber 100 is viewed at a higher optical resolution revealing the graphene capsule 132 deposited on the fiber. The various shading or coloring differences on the surface of fiber 100 show the graphene deposition in either a monolayer, bi-layer, or multilayer of graphene. FIG. 12(*b*) illustrates that the graphene conforms to the contours of optic fiber 100 and uniformly covers it.

Figure 13:
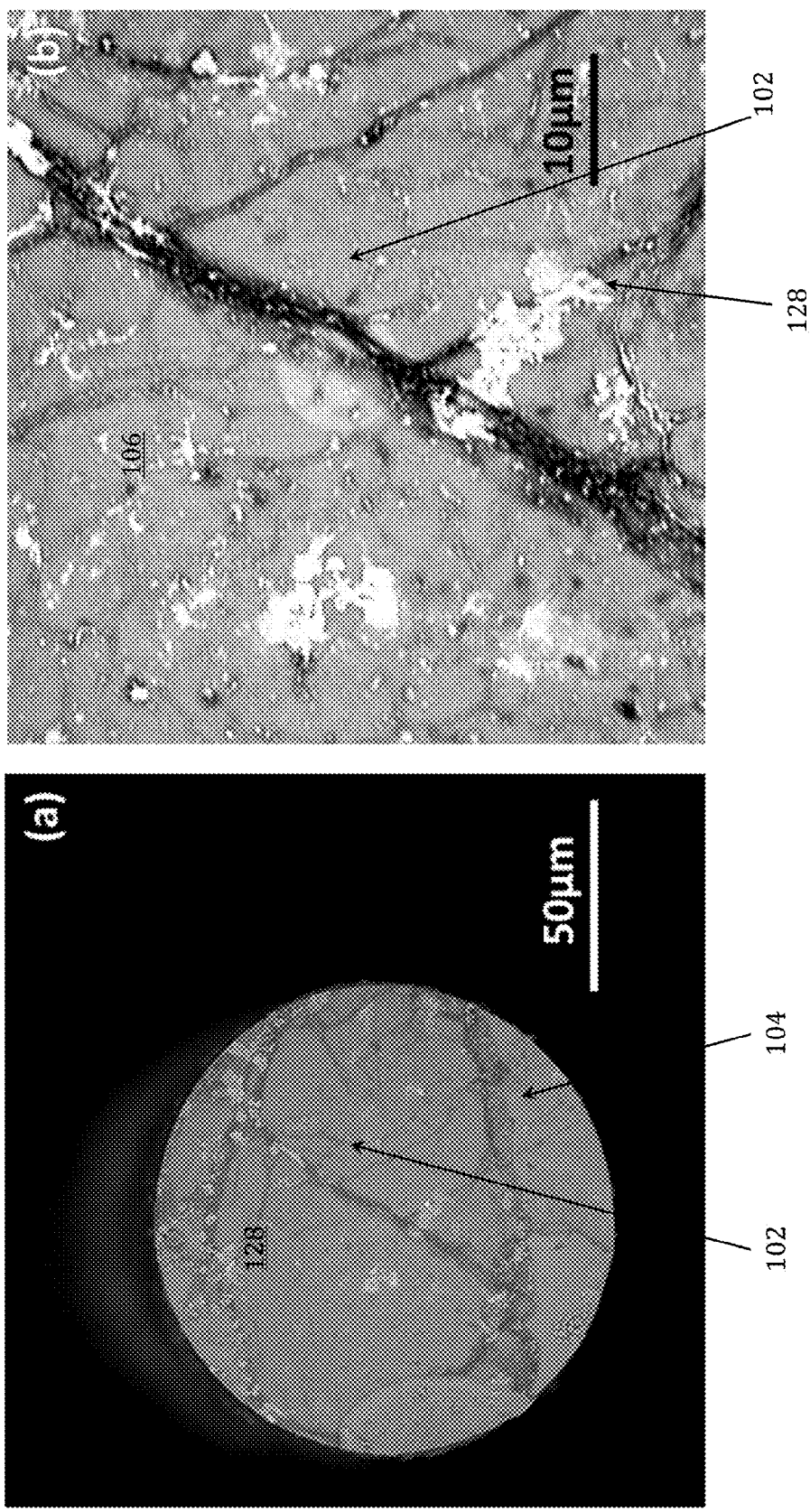
FIG. 13 illustrates SEM images of an end of optic fiber core completely coated with graphene.

FIG. 13 illustrates SEM images of an end of an optic fiber 100 completely coated with graphene. Optic fiber inner core 102 is visible in FIG. 13(*a*) and FIG. 13 (*b*) as a white dot at the center of the image. Surrounding optic fiber inner core 102 is silica outer core 104. The mottled transparent surface covering the end of optic fiber inner core 102 and silica outer core 104 is graphene coating 128 that forms cladding. End graphene surfaces 128 form a protective barrier for the ends of core 102/104 from mechanical damage such as scratches or abrasion. The various differences of color of graphene coating 128 reveals that portions of graphene coating 128 are formed of a monolayer of graphene, a bi-layer of graphene, or a multilayer of graphene. The darker portions of graphene layer 128, appearing as veins, have the most number of overlapping graphene layers.

Figure 14:
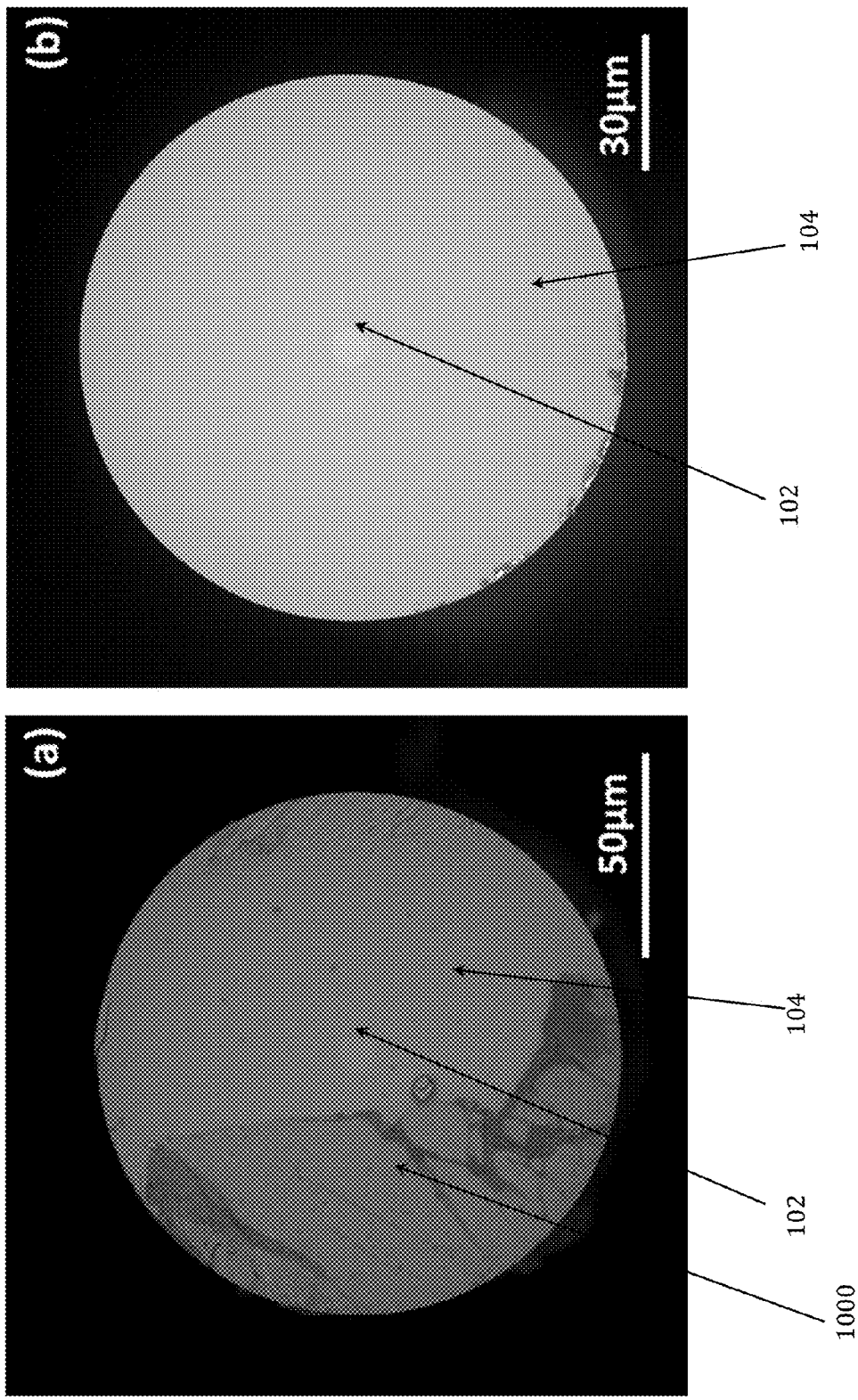
FIG. 14 illustrates SEM images of an end of an optic fiber core partially coated with graphene adjacent to an end of an optic fiber core that is not coated with any graphene.

FIG. 14 illustrates SEM images of an end of an optic fiber inner core 102 and outer core 104 partially coated with graphene 1000 adjacent to an end of an optic fiber inner core 102 and outer core 104 that is not coated with any graphene. FIG. 14 is provided to compare and contrast the end of an optic fiber core 102/104 that is partially covered with graphene 1000 in FIG. 14(*a*) and not covered at all with graphene in FIG. 14(*b*) to the optic fiber core 102/104 end of FIGS. 13(*a*) and (*b*) that is completely covered with graphene sheet 128. In FIG. 14(*b*), the end of optic fiber core 102/104 is bright and uniform in color and texture. In FIG. 14(*a*), a portion of the end of outer core 104 is covered with graphene layer 1000 that shows variances in color/texture due to the fact that some of layer 1000 is a monolayer, a bi-layer, or multilayer of graphene. The darker the color of graphene layer 1000 indicates more layers of graphene compared to lighter areas in color.

Figure 15:
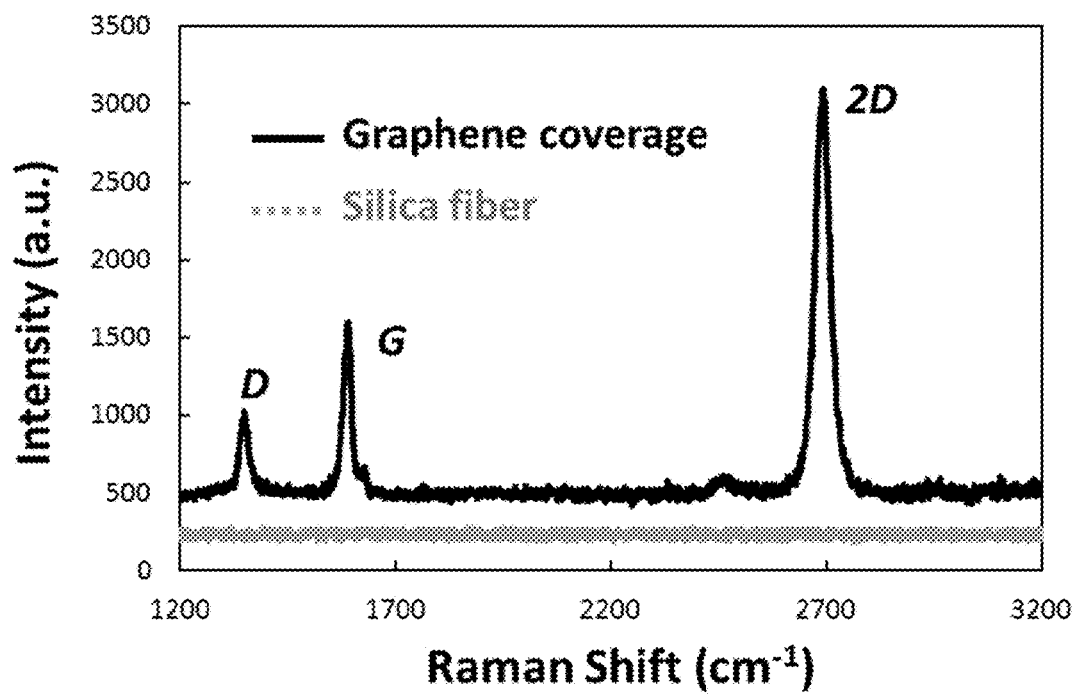
FIG. 15 illustrates a Raman spectra of a graphene coated optic fiber and an optic fiber not coated with graphene for comparison.

FIG. 15 illustrates a Raman spectra of a graphene coated optic fiber and an optic fiber 134 not coated with graphene for comparison. The black solid curve presents the Raman spectra of graphene coating 132 of fiber 100. The narrow D, G and 2D peaks at 1350 cm$^{-1}$, 1580 cm$^{-1}$ and 2690 cm$^{-1}$ show the graphene coating 132 on fiber 100 is of high quality. To compare and contrast, the grey dashed curve presents the Raman spectra of a silica fiber 134 without a graphene coating 132. Note that there area no peaks in the window of 1200 cm$^{-1}$ to 3200 cm$^{-1}$ for the fiber not coated with graphene.

Figure 16:
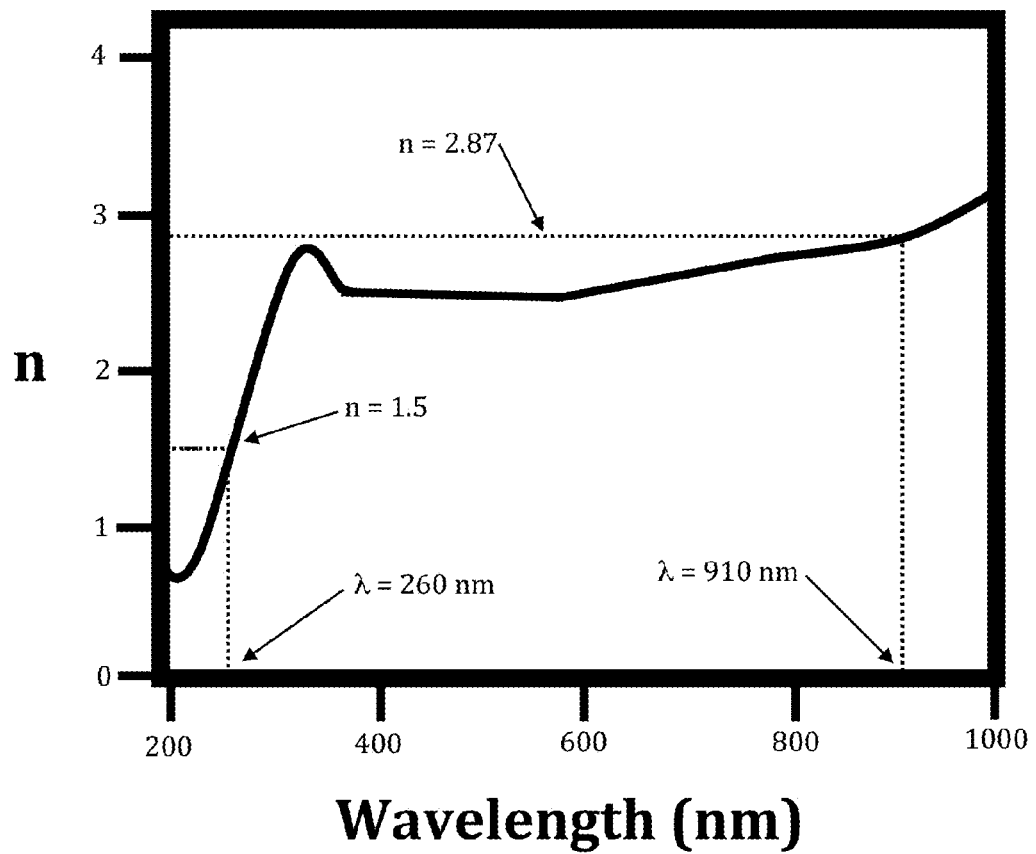
FIG. 16 illustrates the wavelength dependence of the index of refraction n for graphene.

FIG. 16 illustrates the wavelength dependence of the index of refraction n for graphene. The index of refraction of graphene n is dependent upon the wavelength of light. Light having a wavelength from 200 nm to 400 nm is in the ultraviolet spectrum. Light having a wavelength in the range of 400 nm to 600 nm is in the violet-yellow spectrum. Light having a wavelength in the range of 600 nm to 800 nm is in the orange to red spectrum. Light having a wavelength in the range of 800 nm to 1000 nm is in the infrared spectrum. The wavelength dependence of the index of refraction n for graphene is reported in the following reference hereby incorporated by reference: Alex Gray, Mehdi Balooch, Stephane Allegret, Stefan De Gendt, and Wei-E Wang. *Optical detection and characterization of graphene by broadband spectrophotometry*. Journal of Applied Physics 104, 053109 (2008). As shown in FIG. 16, graphene has an index of refraction n<1 at 200 nm. Graphene exhibits an index of refraction n<1.5 below a wavelength of 260 nm. Silica is a common material for optic fiber cores 102 and 104. Silica has an index of refraction of n=1.5. Thus, when optic fiber core 130 is made of silica and propagates light having a wavelength of less than 260 nm, graphene layer 106 can function as cladding because graphene layer 106 has a lower index of refraction than that of silica.

Referring again to FIG. 16, graphene generally exhibits an index of refraction below 3 up to 900 nm. While optic fiber core 130 is generally made of silica (SiO$_2$), other types of glasses may be used for optic fiber core 130. In particular, a variety of high index of refraction glasses may be used for optic fiber core 130. Through utilizing a glass with a higher index of refraction, it is possible to utilize a graphene layer 106 as a cladding layer at higher wavelengths of light. For example, halide-chalcogenide glasses have properties that make them suitable for optical fibers and they are reported to have indices of refraction n ranging from 2.54 to 2.87 as reported in the following reference hereby incorporated by reference: Jan Wasylak, Maria Lacka, Jan Kucharski. *Glass of high refractive index for optics and optical fiber*. Opt. Eng. 36(6) 1648-1651 (June 1997) Society of Photo-Optical Instrumentation Engineers. When optic fiber core 130 is made of a Halide-chalcogenide glass with an index of refraction of 2.87, graphene can be used as a cladding layer 106 for light of wavelengths of less than 910 nm, which is in the infrared portion of the spectrum. Thus, for the deep UV, visible, and a portion of the infrared spectrum Halide-chalcogenide glass may be used for optic fiber core 130 and propagate light from 200 nm to 900 nm with a graphene cladding layer 106. The use of silica and halide-chalcogenide glasses are merely exemplary. It is contemplated that any glass may be utilized for optical fiber core 130 in connection with a graphene cladding capsule 132 with the limitation that the propagation of light wavelengths is limited to the range such that the index of refraction of the graphene is less than the index of refraction of the particular glass used for optic fiber core 130. Examples of other high index refraction glasses include PbO glass that has an index of refraction of n=2. Lanthanum dense flint glass has a refractive index of n=1.8. Flint glass has a refractive index of 1.62. To utilize graphene as a cladding layer, it may be desirable to utilize a monolayer of graphene. Alternatively, it may be desirable to grow multilayer graphene to form a cladding layer. Tellurite glasses of the system TeO$_2$—WO$_3$—PbO, have unique optical and magneto-optical properties, resulting from big mass and polarizability of Pb$^{2+}$ ions. Tellurite glasses are characterized by a high refractive index of about 2.0 and can form optic fibers compatible with a graphene cladding layer.

While the invention has been shown and described with reference to a particular embodiment thereof, it will be understood to those skilled in the art, that various changes in form and details may be made therein without departing from the spirit and scope of the invention.

I claim:

1. A doped fiber amplifier, comprising:
 a doped optic fiber; and
 a graphene cylinder consisting of a contiguous lattice of covalently-bonded carbon atoms located directly on an outer cylindrical surface of said doped optic fiber, thereby containing said doped optic fiber inside said graphene cylinder.

2. The doped fiber amplifier of claim 1, wherein said graphene cylinder is a cladding layer.

3. The doped fiber amplifier of claim 1, wherein said graphene cylinder is formed of multilayer graphene.

4. The doped fiber amplifier of claim 1, wherein said graphene cylinder is deposited onto said doped optic fiber through a Chemical Vapor Deposition (CVD) process.

5. The doped fiber amplifier of claim 1, wherein said doped optic fiber comprises a doped inner core and an undoped outer core, wherein said doped inner core is doped with a rare earth element.

6. The doped fiber amplifier of claim 5, wherein said inner core is doped with a rare earth element selected from a group consisting of erbium, ytterbium, neodymium, dysprosium, praseodymium, and thulium.

7. The doped fiber amplifier of claim 6, further comprising:
 an optical pump that excites the rare earth element to a higher energy state to lase and amplify an optic signal, wherein said doped optic fiber is a gain medium for said doped fiber amplifier.

8. The doped fiber amplifier of claim 7, wherein said optical pump is co-propagating to the optic signal.

9. The doped fiber amplifier of claim 7, wherein said optical pump is counter-propagating to the optic signal.

10. A doped fiber amplifier, comprising:
 a doped optic fiber; and
 a graphene capsule fully encapsulating said doped optic fiber on all sides.

11. The doped fiber amplifier of claim 10, wherein said doped optic fiber comprises a doped inner core surrounded by an undoped outer core, wherein said doped inner core is doped with a rare earth element, wherein said graphene capsule is a cladding layer.

12. The doped fiber amplifier of claim 11, wherein said doped inner core is doped with a rare earth element selected from a group consisting of erbium, ytterbium, neodymium, dysprosium, praseodymium, and thulium.

13. The doped fiber amplifier of claim 12, further comprising:
 an optical pump that excites the rare earth element to a higher energy state to lase and amplify an optic signal, wherein said doped optic fiber is a gain medium for said doped fiber amplifier.

14. An optic fiber amplifier, comprising:
an optic fiber contained within a graphene cylinder that is located directly on an outer cylindrical surface of said optic fiber, said graphene cylinder consisting of a contiguous lattice of covalently-bonded carbon atoms; and
an optical pump coupled to said optic fiber, wherein an optic signal carried by said optic fiber is amplified optically through a Raman effect by said optical pump.

15. The optic fiber amplifier of claim 14, further comprising a pair of graphene end surfaces located at each end of said graphene cylinder, thereby forming a graphene capsule that fully encapsulates said optic fiber on all sides as a cladding layer.

16. The optic fiber amplifier of claim 15, wherein said graphene capsule is formed of multilayer graphene.

17. The optic fiber amplifier of claim 14, wherein said graphene cylinder is deposited onto said optic fiber with a Chemical Vapor Deposition (CVD) process.

18. The optic fiber amplifier of claim 14, wherein said optic fiber encapsulated by said graphene cylinder is a gain medium for said optic fiber amplifier.

19. The doped fiber amplifier of claim 12, wherein said graphene cylinder consists of a contiguous lattice of covalently bonded carbon atoms.

20. The optic fiber amplifier of claim 15, wherein said graphene cylinder is formed of a monolayer of graphene.

\* \* \* \* \*